US005969434A

United States Patent [19]

Slater

[11] Patent Number: 5,969,434

[45] Date of Patent: Oct. 19, 1999

[54] CIRCUIT FOR ACTIVATING AUTOMOBILE BRAKE LIGHTS

[76] Inventor: Benjamin Daniel Slater, 2211 E. Mohawk Rd., No. St. Paul, Minn. 55109

[21] Appl. No.: 09/149,013

[22] Filed: Sep. 8, 1998

[51] Int. Cl.[6] ................................ B60L 1/14; B60Q 1/44

[52] U.S. Cl. ........................................ 307/10.8; 340/479

[58] Field of Search ................................ 307/10.1, 10.8, 307/157; 340/425.5, 453, 457, 468, 471, 472, 479, 467; 315/76, 77

[56] References Cited

U.S. PATENT DOCUMENTS

| | | | |
|---|---|---|---|
| 2,156,751 | 5/1939 | Collins | 340/467 |
| 4,170,723 | 10/1979 | Arsoy | 340/479 |
| 4,922,225 | 5/1990 | Dankert | 340/479 |
| 5,481,243 | 1/1996 | Lurie et al. | 340/479 |
| 5,680,101 | 10/1997 | Pitcher | 340/479 |
| 5,788,358 | 8/1998 | Davis | 340/479 |

*Primary Examiner*—Richard T. Elms
*Attorney, Agent, or Firm*—Thomas B. Tate

[57] ABSTRACT

A circuit for activating automobile brake lights. The circuit includes a battery, rear lights, a horn, horn switch, a center brake light flasher, a brake pedal switch, and a dash indicator light. When the horn in activated, the brake lights come on. When the center brake light flasher is activated, the middle brake light comes on. When the brakes are activated, the dash indicator light comes on.

2 Claims, 1 Drawing Sheet

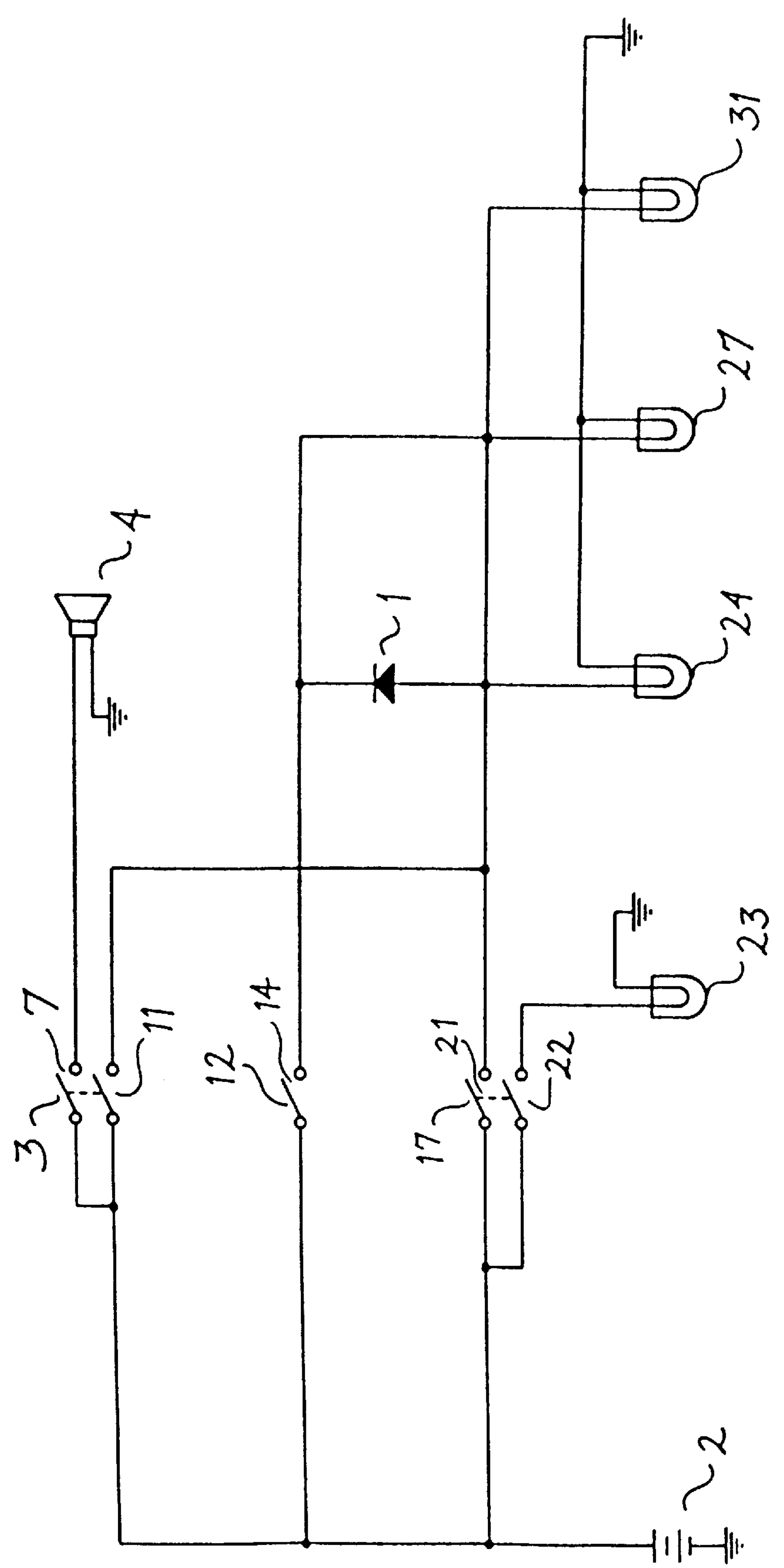
1
2
3
4
7
11
12
14
17
21
22
23
24
27
31

CIRCUIT FOR ACTIVATING AUTOMOBILE BRAKE LIGHTS

BACKGROUND OF THE INVENTION

The field of the invention is electrical circuits for activating automobile warning lights, particularly brake lights.

In the prior art, brake lights come on only when the brakes are applied. However, sometimes it is necessary to warn following drivers of hazards or delays ahead before the brakes are applied or in situations where the brakes need not be applied.

Most modern cars have an antilock braking system (ABS). With an ABS, unlike with older braking systems, the driver should not pump the brakes when driving on icy roads (rather he should hold the brake pedal down steadily) because the ABS pumps automatically. However, some drivers who are used to driving with older braking systems may forget that they are not supposed to pump the brakes with the ABS.

SUMMARY OF THE INVENTION

The present invention is designed to solve the two problems noted above. When the horn is honked, the brake lights come on even if the brakes are not applied. When the driver presses a button on the dashboard or steering wheel which serves as a center brake light flasher, the center (high filament) brake light comes on momentarily even if the brakes are not applied. Thus the following drivers are warned of potential hazards.

When the brakes are applied, the dash indicator light comes on to indicate that the brake lights are on, and if intermittent, would warn the driver that the brakes are being pumped so that the driver can avoid pumping the brakes with an ABS.

DESCRIPTION OF THE DRAWING

The FIGURE is a schematic diagram of the circuit.

DESCRIPTION OF THE INVENTION

The circuit includes a battery 2, rear lights including left brake light 24, middle brake light 27, and right brake light 31, a dash indicator light 23, a horn 4, a horn switch 3, a center brake light flasher 12, and a brake pedal switch 17.

The horn switch 3, the center brake light flasher 12, and the brake pedal switch 17 are each wired to the battery 2. The horn switch 3, which is a double pole single throw switch, has a first contact 7 which is wired to the horn 4 and a second contact 11 which in wired to the left brake light 24, middle brake light 27, and right brake light 31. When the horn is honked, contacts 7 and 11 close, allowing current from the battery 2 to flow through horn switch 3 to the horn 4 and to all three rear brake light 24, 27, and 31 to turn them on.

The center brake light flasher 12, which is a single pole single throw momentary switch, has one contact 14 which is wired to the middle brake light 27, and which is also wired by an alternate pathway through a diode 1 to all three brake lights 24, 27, and 31. When the driver presses a button on the dashboard or steering wheel to activate the center brake light flasher 12, contact 14 closes, allowing current from the battery 2 to flow through center brake light flasher 12 to the middle brake light 27 to turn middle brake light 27 on. Current could also flow through diode 1 to all three brake lights 24, 27, and 31 to turn them on.

The brake pedal switch 17, which is a double pole single throw switch, has a first contact 21 which is wired to all three brake lights 24, 27, and 31, and a second contact 22 which is wired to dash indicator light 23. When the driver presses the brake pedal, contacts 21 and 22 close, allowing current from the battery 2 to flow through brake pedal switch 17 to left brake light 24, middle brake light 27, and right brake light 31 and also to dash indicator light 23 to turn each of these lights on. Thus when the brake lights 24, 27, and 31 are on, the dash indicator light 23 is also on to indicate to the driver that brake lights 24, 27, and 31 are on.

I claim:

1. A circuit for activating automobile brake lights, said circuit comprising:

a battery;

rear lights including a left brake light, a middle brake light, and a right brake light;

a horn;

a dash indicator light;

a horn switch connected by wiring to said battery, said horn switch being a double pole single throw switch wherein one contact of said switch is connected by wiring to said horn and the other contact of said switch is connected by wiring to said rear lights;

a center brake light flasher which is a single pole single throw momentary switch, said switch being connected by wiring to said battery, connected by wiring to said middle brake light, and connected by wiring through a diode to said left brake light, said middle brake light, and said right brake light;

a brake pedal switch connected by wiring to said battery, said brake pedal switch being a double pole single throw switch wherein one contact of said switch is connected by wiring to said rear lights and the other contact of said switch is connected by wiring to said dash indicator light.

2. The circuit of claim 1 wherein said circuit operates as follows:

when said horn switch is activated, both of said contacts of said horn switch close, allowing battery current to flow therethrough to sound said horn and turn on said rear lights;

when said center brake light flasher is activated, the contact of said center brake light flasher closes, allowing battery current to flow therethrough to turn on said middle brake light;

when said brake pedal switch is activated, both of said contacts of said brake pedal switch close, allowing battery current to flow therethrough to turn on said rear lights and said dash indicator light.

* * * * *